Feb. 9, 1954　　　A. CHMIELEWSKI　　　2,668,492
SALT ATTACHMENT FOR PICKUP BALERS
Filed June 26, 1951　　　　　　　　　　　　2 Sheets-Sheet 1
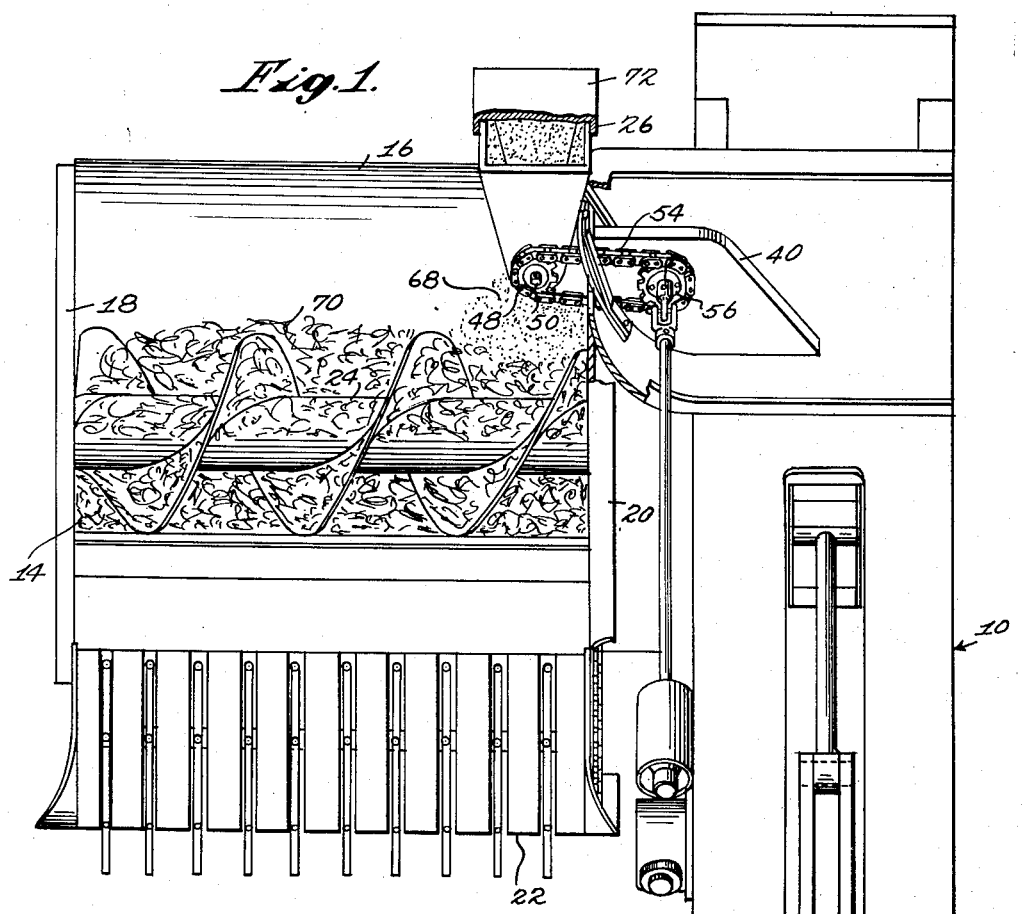
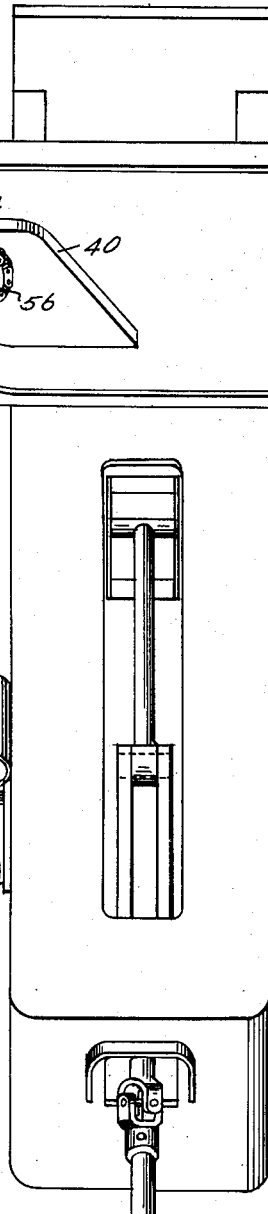
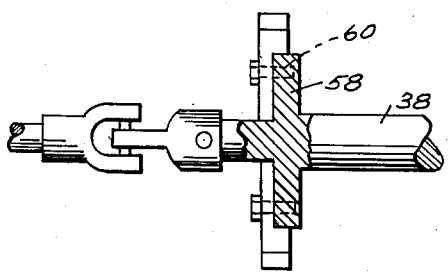
INVENTOR
ANTON CHMIELEWSKI
BY
McMorrow, Berman + Davidson
ATTORNEYS Feb. 9, 1954  A. CHMIELEWSKI  2,668,492
SALT ATTACHMENT FOR PICKUP BALERS
Filed June 26, 1951  2 Sheets-Sheet 2
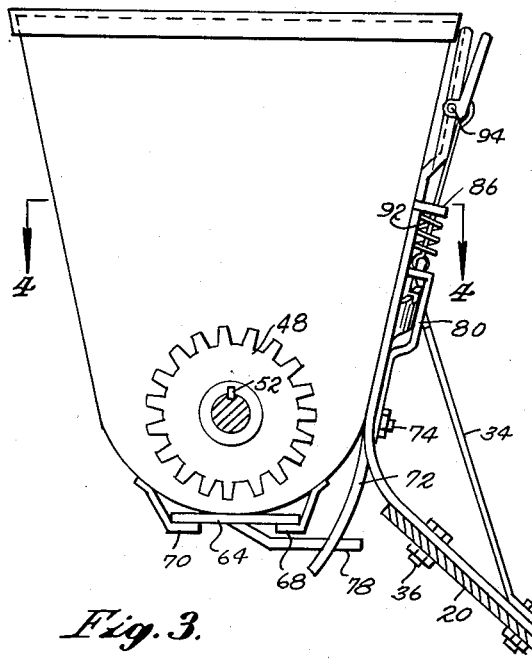
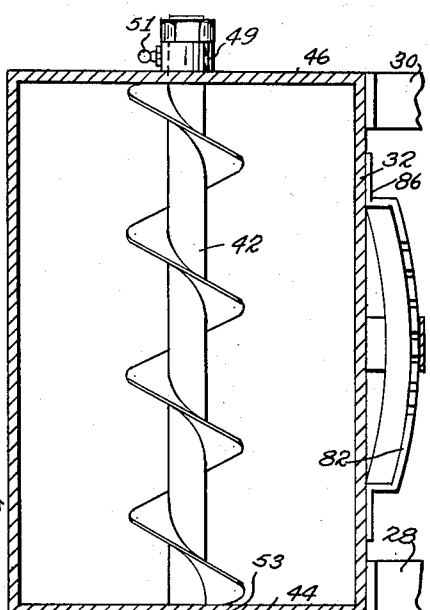
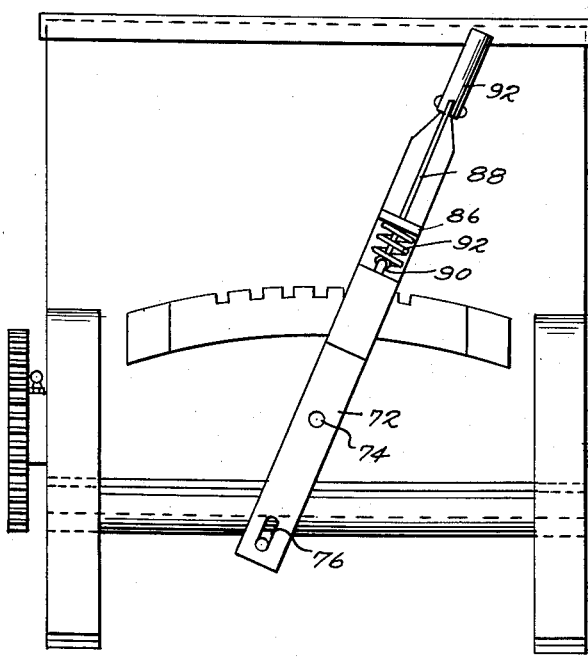
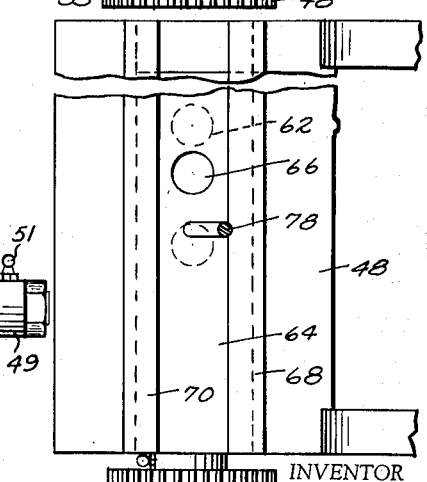
INVENTOR
ANTON CHMIELEWSKI
BY
McMorrow, Berman & Davidson
ATTORNEYS Patented Feb. 9, 1954

2,668,492

UNITED STATES PATENT OFFICE 2,668,492

SALT ATTACHMENT FOR PICKUP BALERS

Anton Chmielewski, Iron River, Mich.

Application June 26, 1951, Serial No. 233,585

1 Claim. (Cl. 99—235)

This invention appertains to improvements in salt feeding attachments for fodder machines and especially relates to salt feeding attachments for stationary or mobile pick-up balers.

The primary object of this invention is to provide means for retaining a supply of salt in a position to be freely deposited onto hay or the like, as it is being fed into a baling mechanism.

Another object of this invention is to provide an inexpensive, compact salt feeding attachment for a baler, which can be operatively mounted on the baler in a position to overlie the feed auger for distributing a controlled amount of salt onto the hay, as it is fed by the auger into the baling chamber of the baler.

A further object of this invention is to provide means for mounting a supply hopper on a conventional baler, without requiring any modification of the baler structure and to provide means for agitating the salt in the hopper, the agitating means being driven by the drive shaft for the packer fingers and control means for controlling the gravitation of the salt from the hopper onto the baler feed auger being provided and being easily and conveniently operated.

These and ancillary objects and structural features of merit are attained by this invention, the preferred embodiment of which is set forth in the following description and illustrated in the accompanying drawings, wherein:

Figure 1 is a top plan view of a conventional hay pick-up baler, with a salting attachment constructed in accordance with the principles of this invention, being operatively mounted thereon;

Figure 2 is a front elevational view of the supply hopper and illustrating the mounting means therefor and the means for controlling the flow of salt therefrom;

Figure 3 is a rear elevational view of the hopper;

Figure 4 is a cross sectional view taken on line 4—4 of Figure 2;

Figure 5 is a fragmentary bottom plan view of the hopper, illustrating the side valve plate, provided for controlling the rate of flow of the salt from the hopper, and, Figure 6 is a fragmentary elevational view, partly in section, of the packer fingers drive shaft, illustrating the means for mounting a gear thereon, which constitutes a part of the drive transmitting means for the agitating means in the hopper.

Referring now more particularly to the accompanying drawings, a conventional pick-up baler 10 is illustrated, the same including a pick-up and feeding chamber 14, which is defined by a back wall 16 and opposing side walls 18 and 20. A spring tooth pick-up cylinder 22 is transversely disposed between the side walls at the forward end of the chamber and a floating feed auger 24 is transversely journaled between the side walls, rearwardly of the pick-up cylinder and adjacent to the back wall 16.

In accordance with this invention, a supply hopper 26, within which a supply of salt is disposed, is mounted on the side wall 20, adjacent to the back wall 16 and in a position so that the hopper vertically overlies the inner end of the feed auger, adjacent to the baling chamber. A pair of arms 28 and 30 are fixed to the side wall 32 of the hopper and extend downwardly and outwardly therefrom, the arms being rigidified by brace bars 34 and being bolted by bolts 36 or otherwise affixed to the outer surface of the side wall 20, as seen in Figure 2.

A conventional drive shaft 38 for the packer fingers (not shown) is journaled in an upstanding web 40, over the baling chamber, and is conventionally connected by a suitable drive transmitting shafting to the power takeoff on the tractor. The packer fingers drive shaft 38 is utilized as the driving means for an agitator 42, which has its shaft journaled through the walls 44 and 46 of the hopper, adjacent to the lower discharge end 48 of the hopper. One end of the shaft is provided with a bearing cap 49 having a lubricating fitting 51 and the other end 50 of the shaft is provided with a bearing 53 and lubricating fitting 55. The agitator is provided to constantly agitate the salt in the hopper, so that the salt does not become packed or hardened and the gravitation thereof from the hopper being impeded in such a manner. A gear 48 is fixedly superimposed on the extending end 50 of the agitator shaft and is keyed thereon by a key 52. A chain 54 drivingly connects the gear 48 with a gear 56, which is fixedly circumposed on the drive shaft 38 for the packer fingers, the chain being extended through a suitable opening formed in the side wall 20 of the feeding chamber of the baler.

The shaft 38 is conventionally formed with an annular shoulder 58 and the shoulder is utilized as means for mounting the gear 56 to the shaft. In this respect, the gear 56 is formed of two segments and each of the segments is bolted by fasteners 60 to the outer side of the shoulder 58, as seen in Figure 6. Thus, the agitator 42 is constantly rotated within the hopper, by the drive transmitting chain 54, which is entrained on the gear 56.

Spaced circular discharge openings 62 are formed in the bottom wall 48 of the hopper and a slide valve plate 64 is slidably disposed in a position underlying the bottom wall for controlling the size of the openings 62. The plate 64 is formed with openings 66, which are registrable with the openings 62 and the opposing size edges of the plate are slidably retained on guides or runners 68 and 70, which are affixed to the bottom wall 48 of the hopper, as seen in Figure 2.

The valve plate 64 is slidably moved on the guides 68 and 70 by an operating lever 72, which is pivoted by a pin 74 to the side 32 of the hopper, as seen in Figure 3. An axial slot 76 is formed in the lower end of the lever and receives the outer end of a pin 78, which is fixed to the underside of the plate 64 and which extends downwardly and outwardly therefrom. A U-shaped offset 80 is formed in the lever and overlies a toothed quadrant or ratchet bar 82, which is secured by terminal mounting flanges 84 and 86 to the wall 32 of the hopper.

An apertured ear 68 extends outwardly from the lever, above the offset 80, the ear being disposed parallel with the upper end of the offset and receiving a rod 88, which carries a pawl 90. The pawl is, of course, engageable with the teeth in the bar 82 and a spring 92 is concentrically disposed on the rod 88, the spring having its ends abutting the lower end of the rod and the underside of the ear 86, so that the pawl is constantly biased or urged into engagement with the teeth in the bar. A handle 92 carries the rod 88 and is pivoted on a pin 94 extending through the lateral ears in the handle, to the upper end of the lever 72.

In constructing the combined salt attachment and baler, the gear 56 is bolted by the bolts 60 to the shoulder 58 of the shaft 38 and the hopper is mounted by means of the reinforced and braced mounting arms to the wall 20 of the feeding chamber of the baler. The chain is then entrained over the gears 48 and 56 and, after a supply of salt has been deposited in the hopper, the attachment is ready for use.

In use, the lever 72 is swung around its pivot 74 to position the plate 64 in accordance with the desired rate of gravitation of the salt, through the registered openings 62 and 66 in the hopper and valve plate. The plate is, of course, retained in position by the pawl and the salt 68 will gravitate through the registered openings 62 and 66, the salt being maintained in a proper gravitational state by the agitator 42, which prevents the salt from becoming hardened and obviates the formation of cakes.

It will be especially noted that the hopper overlies the inner end of the feed auger, so that the hay 70, as it is being fed by the auger into the baling chamber for engagement with the packer fingers, is salted and, of course, after the hay is baled, it will be salted and ready for use as fodder.

To protect the salt from the elements, a cover 72 is provided for the hopper and is detachably seated on the upper coplanar edges thereof, with the depending peripheral flange on the cover overlying the upper edges.

Having thus described this invention, what is claimed is:

A salt attachment for a baler of the type having a feeding chamber provided with a side wall, a feed auger disposed transversely to and extending from the wall, and a packer fingers drive shaft paralleling the wall on the side opposite from the feed auger and including a circumferential shoulder, comprising: a hopper having a bottom wall; mounting arms depending from the hopper and adapted to be affixed to the feeding chamber side wall adjacent said shoulder with the hopper vertically overlying the feed auger; an agitator rotatably journaled in the hopper; drive means for said agitator connected to the packer fingers drive shaft and including a circular drive wheel formed of plurality of wheel segments circumposed about the shaft in abutting relation to and fixedly attached to the shoulder, said drive means further including a driven wheel on the agitator and an endless flexible element connecting the drive and driven wheels for joint rotation; and manually operable valve means on the bottom wall of the hopper for controlling the discharge of salt therefrom.

ANTON CHMIELEWSKI.

References Cited in the file of this patent

UNITED STATES PATENTS

| Number | Name | Date |
|---|---|---|
| 506,892 | Wiebe | Oct. 17, 1893 |
| 1,444,648 | Willis et al. | Feb. 6, 1923 |
| 1,858,090 | Hull | May 10, 1932 |
| 1,948,668 | Kuchler | Feb. 27, 1934 |
| 2,504,279 | Sanner | Apr. 18, 1950 |
| 2,541,008 | Stahmer et al. | Feb. 6, 1951 |
| 2,567,760 | Boughan | Sept. 11, 1951 |
| 2,571,489 | Russell | Oct. 16, 1951 |